United States Patent
Oh et al.

(10) Patent No.: US 8,193,666 B2
(45) Date of Patent: Jun. 5, 2012

(54) MOTOR AND COMPRESSOR TECHNOLOGY

(75) Inventors: Seung-Suk Oh, Seoul (KR); Jin-Soo Park, Seoul (KR)

(73) Assignee: LG Electronics Inc., Seoul (KR)

( * ) Notice: Subject to any disclaimer, the term of this patent is extended or adjusted under 35 U.S.C. 154(b) by 337 days.

(21) Appl. No.: 12/607,133

(22) Filed: Oct. 28, 2009

(65) Prior Publication Data

US 2010/0150750 A1 Jun. 17, 2010

(30) Foreign Application Priority Data

Dec. 15, 2008 (KR) ........................ 10-2008-0127498

(51) Int. Cl.
*H02K 9/19* (2006.01)
*H02K 1/22* (2006.01)
*H02K 1/32* (2006.01)
*H02K 5/20* (2006.01)
*F04B 35/04* (2006.01)

(52) U.S. Cl. ................ 310/61; 310/156.53; 310/156.57; 310/216.106; 417/410.1

(58) Field of Classification Search .......... 310/156.433–156.58, 58–61, 60 A, 216.106, 216.111; 324/146–147; 417/410.1, 425.1
See application file for complete search history.

(56) References Cited

U.S. PATENT DOCUMENTS

| | | | | |
|---|---|---|---|---|
| 3,634,873 | A * | 1/1972 | Nishimura | 318/400.37 |
| 5,508,576 | A * | 4/1996 | Nagate et al. | 310/156.54 |
| 6,208,054 | B1 | 3/2001 | Tajima | |
| 6,703,748 | B2 * | 3/2004 | Arai et al. | 310/179 |
| 7,049,518 | B2 * | 5/2006 | Kimura et al. | 174/74 R |
| 7,056,104 | B2 * | 6/2006 | Kimura et al. | 417/410.1 |
| 7,119,507 | B2 | 10/2006 | Nishijima | |
| 7,425,786 | B2 | 9/2008 | Hino | |
| 7,484,945 | B2 * | 2/2009 | Okaichi et al. | 418/63 |
| 7,843,101 | B2 * | 11/2010 | Ito et al. | 310/156.56 |
| 2001/0014293 | A1 * | 8/2001 | Tsumagari et al. | 418/55.4 |
| 2002/0130580 | A1 * | 9/2002 | Arai et al. | 310/214 |
| 2004/0145263 | A1 | 7/2004 | Kojima et al. | |
| 2006/0145556 | A1 | 7/2006 | Aota | |
| 2007/0126304 | A1 | 6/2007 | Ito et al. | |

OTHER PUBLICATIONS

European Search Report dated May 27, 2011 for Application No. 09179031.1, 6 pages.

* cited by examiner

*Primary Examiner* — Tran Nguyen

(74) *Attorney, Agent, or Firm* — Fish & Richardson P.C.

(57) ABSTRACT

An interior permanent magnet type brushless direct current (BLDC) motor includes a stator having a plurality of slots. The BLDC motor also includes a rotor positioned in the stator and that is rotatable with respect to the stator. The rotor has a rotor core, a plurality of permanent magnets inserted in the rotor core, a plurality of vent holes positioned between the center of the rotor core and the permanent magnets, and a plurality of coupling holes positioned between the permanent magnets and a periphery of the rotor core.

11 Claims, 4 Drawing Sheets

MOTOR AND COMPRESSOR TECHNOLOGY

CROSS-REFERENCE TO RELATED APPLICATIONS

The present application claims the benefit of priority to Korean Application No. 10-2008-0127498, filed on Dec. 15, 2008, the contents of which is incorporated by reference herein in its entirety.

FIELD

The present disclosure relates to an interior permanent magnet type brushless direct current (BLDC) motor and a compressor.

BACKGROUND

Motors may be classified into a direct current (DC) motor and an alternating current (AC) motor depending on power used. The DC motor has a commutator and a brush. Due to a mechanical contact between the commutator and the brush, reliability of the DC motor is lowered and a lifespan thereof may be shortened.

An electronic switching type brushless DC (BLDC) motor using a semiconductor device also has been used. The BLDC motors may be classified into an interior rotor type and an exterior rotor type according to an arrangement of stator and rotor.

The interior rotor type motor either uses a rotor that a rotation shaft is inserted into a center of a cylindrical permanent magnet, or uses a so-called interior permanent magnet type rotor that a rotation shaft is inserted into a center of a rotor core having electrical steel sheets stacked thereon and then a plurality of permanent magnets are inserted in the rotor core.

The interior permanent magnet type rotor has a core which a plurality of circular electrical steel sheets are stacked for insulation. The core includes a shaft hole formed through a center thereof such that a rotation shaft can be inserted therein, and permanent magnet insertion portions passed through a periphery of the shaft hole such that a plurality of permanent magnets can be axially positioned therein. The stacked core may be welded to maintain its stacked state or be fixed by using coupling members coupled through each electric sheet plates in an axial direction.

The interior permanent magnet type rotor has flux barriers defined at both end regions of each permanent magnet for reducing a leakage of flux of each permanent magnet.

However, in the related art interior permanent magnet type BLDC motor, the flux barriers are positioned at end portions of each permanent magnet for reducing the flux leakage out of the permanent magnets. When a rotor rotates fast, stress is concentrated on regions of the flux barriers that is configured to have relatively thin ribs due to a centrifugal force, thereby causing deformation and damage of the rotor.

If the thickness of ribs of each flux barrier region is increased to overcome the above problem, the flux leakage of the rotor is also increased, resulting in the lowering of motor performance.

SUMMARY

In one aspect, an interior permanent magnet type brushless direct current (BLDC) motor includes a stator having a plurality of slots. The BLDC motor also includes a rotor positioned in the stator, configured to rotate with respect to the stator, and having a rotor core, a plurality of permanent magnets positioned in the rotor core, a plurality of vent holes positioned between a center of the rotor core and the permanent magnets, and a plurality of coupling holes positioned between the permanent magnets and a periphery of the rotor core.

Implementations may include one or more of the following features. For example, the BLDC motor further includes a plurality of flux barriers positioned at the rotor core. A central line of at least one vent hole is positioned at a center of adjacent flux barriers. A center of at least one coupling hole is positioned within an electrical angle between −5° and +5° from a magnet central line of the rotor.

In some examples, a center of at least one vent hole is positioned within a range of an electrical angle between 80° and 100° from a magnet central line of the rotor. A cross-sectional area of at least one vent hole corresponds to 6% to 8% of a cross-sectional area of the core. A central line of at least one vent hole is positioned at a center of two magnet central lines.

In another aspect, an interior permanent magnet type brushless direct current (BLDC) motor includes a stator having a plurality of slots. The BLDC motor also includes a rotor positioned in the stator, configured to rotate with respect to the stator, and having a rotor core, a plurality of permanent magnets positioned in the rotor core, coupling holes positioned between a periphery of the rotor core and the permanent magnets, and coupling members coupled to the coupling holes, wherein each of the coupling holes is positioned between the periphery of the rotor core and the corresponding permanent magnet.

Implementations may include one or more of the following features. For example, a center of at least one coupling hole is positioned within a range of an electrical angle between −5° and +5° from a central line of at least one pole of the rotor. The BLDC motor further includes at least one vent hole positioned between a rotation shaft and at least one permanent magnet.

In some examples, a central line of the vent hole is positioned between adjacent permanent magnets. A central line of the vent hole is positioned at a center of adjacent magnet central lines. A cross-sectional area of the vent hole corresponds to 6% to 8% of a cross-sectional area of the core. A center of the vent hole is positioned within an electrical angle between 80° and 100° from a central line of a pole of the rotor.

In yet another aspect, an interior permanent magnet type brushless direct current (BLDC) motor includes a stator having a plurality of slots. The BLDC motor also includes a rotor positioned in the stator, configured to rotate with respect to the stator, and having a rotor core, a plurality of permanent magnets positioned in the rotor core, a plurality of vent holes positioned between the center of the rotor core and the permanent magnets, and a plurality of coupling holes that each corresponds to a permanent magnet that are each positioned outside of the corresponding permanent magnet.

Implementations may include one or more of the following features. For example, a center of at least one coupling hole is positioned within an electrical angle between −5° and +5° from a magnet central line of the rotor. A center of at least one vent hole is positioned within an electrical angle between 80° and 100° from a magnet central line of the rotor. A cross-sectional area of at least one vent hole corresponds to 6% to 8% of a cross-sectional area of the core.

In yet another aspect, a compressor having an interior permanent magnet type brushless direct current (BLDC) motor includes a compression part positioned in a case and configured to compress a refrigerant. The compressor also includes the BLDC motor configured to provide a driving force to the compression part. The BLDC motor includes a stator having a plurality of slots and a rotor positioned in the stator, configured to rotate with respect to the stator, and having a rotor core, a plurality of permanent magnets positioned in the rotor core, a plurality of vent holes positioned between a center of the rotor core and the permanent magnets, and a plurality of coupling holes positioned between the permanent magnets and a periphery of the rotor core.

Implementations may include one or more of the following features. For example, a center of at least one coupling hole is positioned within an electrical angle between −5° and +5° from a magnet central line of the rotor. A center of at least one vent hole is positioned within an electrical angle between 80° and 100° from a magnet central line of the rotor. A cross-sectional area of at least one vent hole corresponds to 6% to 8% of a cross-sectional area of the core.

In yet another aspect, a compressor having an interior permanent magnet type brushless direct current (BLDC) motor includes a compression part positioned in a case and configured to compress a refrigerant. The compressor also includes the BLDC motor configured to provide a driving force to the compression part. The BLDC motor includes a stator having a plurality of slots and a rotor positioned in the stator, configured to rotate with respect to the stator, and having a rotor core, a rotation shaft positioned at a center of the rotor core, a plurality of permanent magnets positioned in the rotor core, coupling holes positioned between a periphery of the rotor core and the permanent magnets, and coupling members coupled to the coupling holes, wherein each of the coupling hole is positioned between the periphery of the rotor core and the corresponding permanent magnet.

DETAILED DESCRIPTION

Figure 1:
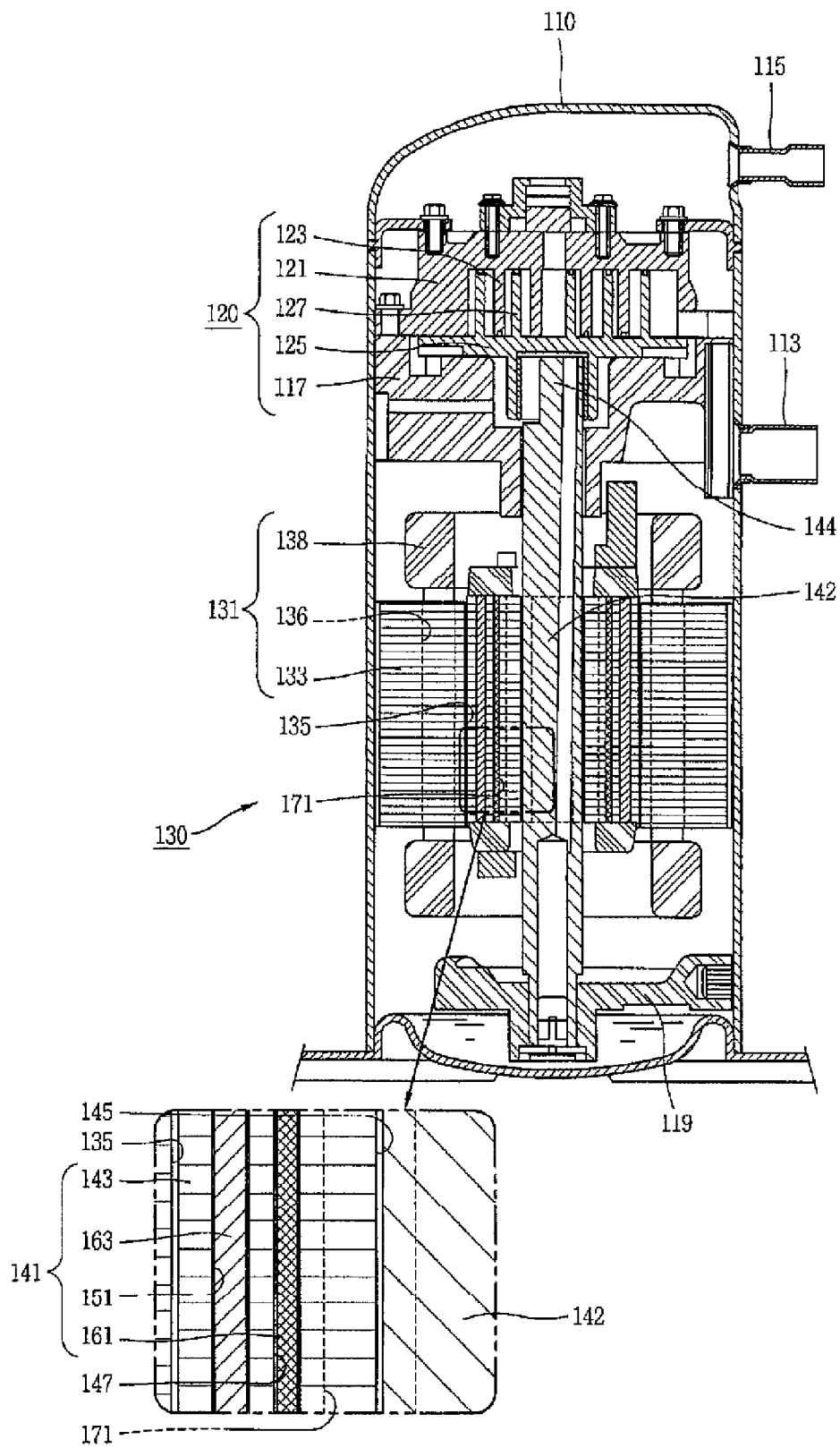
FIG. 1 is a vertical cross-sectional view of a compressor having an interior permanent magnet type BLDC motor.

As shown in FIG. 1, a compressor having an interior permanent magnet type BLDC motor may include a case 110 having an accommodation space therein, a compression part 120 positioned within the case 110 for compressing a refrigerant, and an interior permanent magnet type BLDC motor 130 positioned within the case 110 for providing a driving force to the compression part 120.

At one side of the case 110 A suction pipe 113 may be positioned at one side of the case 110 such that a refrigerant is sucked into the case 110. A discharge pipe 115 may be positioned at one side (e.g., an upper side) such that a compressed refrigerant is discharged.

The compression part 120 may include a fixed scroll 121 having a fixed rap 123 in an involute shape and fixed into the case 110, and an orbiting to scroll 125 having an orbiting rap 127 in the involute shape and coupled to the fixed scroll 121 to enable a relative motion to the fixed scroll 121.

A main frame 117 for supporting the compression part 120 may be positioned at an upper region within the case 110. A sub frame 119 for supporting a rotation shaft 142 of the interior permanent magnet type BLDC motor 130 may be positioned at a lower region of the case 110.

The interior permanent magnet type BLDC motor 130 may include a stator 131 fixed into the case 110, and a rotor 141 configured to be rotatable with respect to the stator 131 based on the rotation shaft 142. An eccentric portion 144 for allowing an eccentric motion of the orbiting scroll 125 may be defined at an upper end of the rotation shaft 142.

The stator 131 may include a rotor accommodation hole 135 positioned in a center of the stator 131 for accommodating the rotor 141, and a stator core 133 having a plurality of slots 136 and teeth positioned along a circumferential direction of the rotor accommodation hole 135, and a stator coil 138 wound on the slots 136. The stator coil 138 may be configured as a distributed winding simultaneously wound on two or more teeth.

Figure 2:
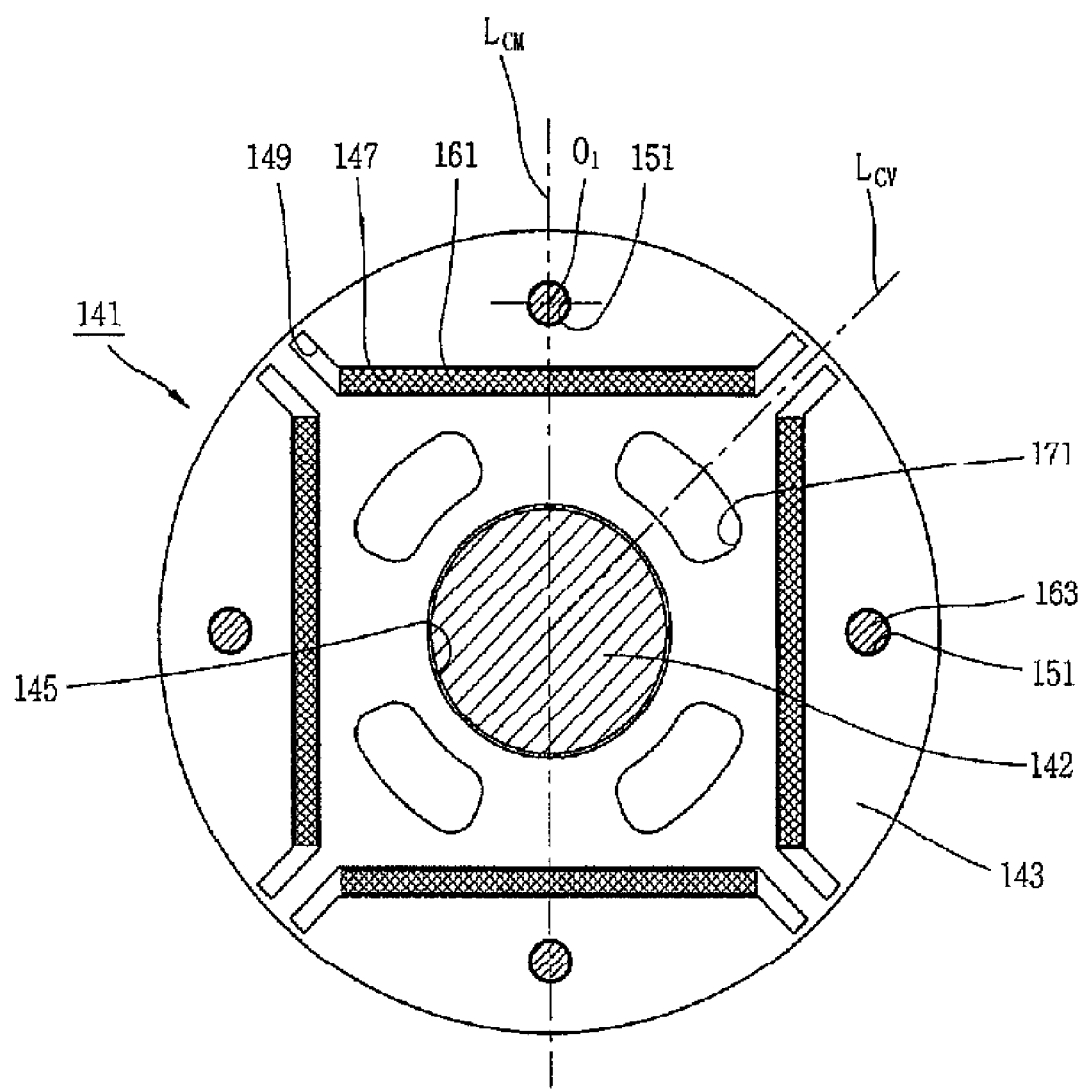
FIG. 2 is a plane view of a rotor of FIG. 1.

The rotor 141, as shown in FIG. 2, may include a rotor core 143 having a shaft hole 145 positioned at a center of the rotor for accommodating the rotation shaft 142, permanent magnet insertion portions 147 positioned at the periphery of the shaft hole 145, and coupling holes 151 positioned outside the corresponding permanent magnet insertion portions 147. The rotor 141 also may include permanent magnets 161 inserted in the corresponding permanent magnet insertion portions 147, and coupling members 163 inserted in the corresponding coupling holes 151.

The rotor core 143 may have a plurality of electric steel sheets that the shaft hole 145, the permanent magnet insertion portions 147 and the coupling holes 151 are passed through. The electric steel sheets are stacked for insulation and then, integrally fixed by the coupling members 163.

The coupling members 163 may be configured as rivets. Alternatively, the coupling members 163 may include fixing bolts (not shown) inserted in the coupling holes 151 and nuts (not shown) screwed to exposed end portions of the fixing bolts.

The rotor 141 may have, for example, four poles, and the stator core 143 may include four permanent magnet insertion portions 147 such that four permanent magnets 161 can be inserted therein. Each of the permanent magnet insertion portions 147 may be passed through the rotor core 143 and configured to have a rectangular section such that the permanent magnets 161 with a shape of a rectangular plate can be inserted in an axial direction. The permanent magnet insertion portions 147 may be positioned perpendicular to one another.

Flux barriers 149 for reducing a flux leakage from each permanent magnet 161 may be positioned at both end regions of each permanent magnet insertion portion 147. Each of the flux barriers 149 may extend close to the circumference of the rotor core 143. Each of the flux barriers 149 may be connected to each of the permanent magnet insertion portions 147.

Each of the coupling holes 151 may be positioned such that a center of the coupling hole $O_1$ can be located within an electrical angle between −5° and +5° with respect to the center (or central line) $L_{CM}$ of each permanent magnet 161. Here, it may be set to the electrical angle of 360° that different poles N and S of the permanent magnet 161 pass through a reference point once upon the rotation of the rotor 141. That is, for a two-pole rotor, the electrical angle is 360° upon the one-time rotation of the rotor. For a four-pole rotor, the electrical angle is 720° upon the one-time rotation of the rotor. As shown in FIG. 2, the center of the coupling hole $O_1$ is positioned on the central line $L_{CM}$ of the permanent magnet 161.

In addition, the rotor 141 may have vent holes 171 passed through the rotor core 143 and configured to facilitate flowing of a refrigerant within the case 110 in a vertical direction.

Each vent hole 171 may be positioned such that a center of the vent hole 171 central line $L_{CV}$ can be located within an electrical angle between 80° and 100° with respect to the central line $L_{CM}$ of each permanent magnet 161. As shown in FIG. 2, each vent hole 171 may be positioned such that the central line $L_{CV}$ can be spaced apart an electrical angle of 90° from the central line $L_{CM}$ of the permanent magnet 161. Based on the above vent hole location, a saturation of the rotor core 143 due to the flux of the permanent magnet 161 can be reduced and the lowering of a back electromotive force (BEMF) of the motor is reduced. Hence, a motor efficiency can be enhanced and an energy efficiency ratio (EER) of the compressor can be improved.

Each of the vent holes 171 is, for example, configured to have a cross-sectional area corresponding to 6% to 8% of the cross-sectional area of the rotor core 143. Therefore, reluctance can be further reduced and a smooth flow of a refrigerant is accomplished.

Figure 3:
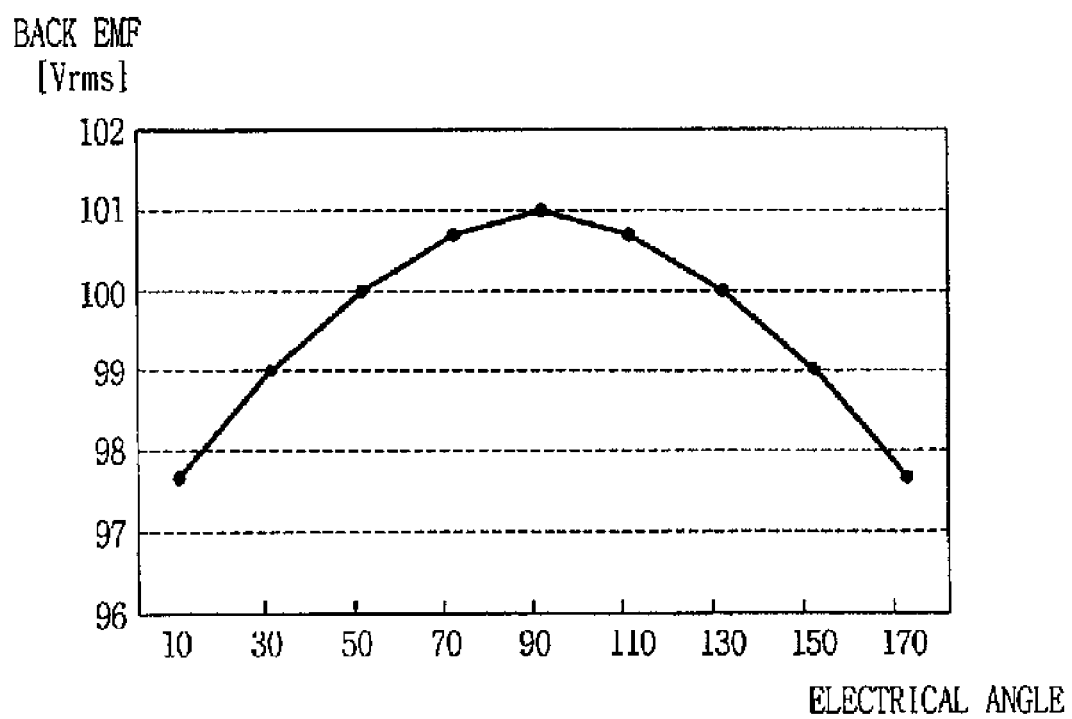
FIG. 3 is a view showing changes in a back electromotive force (BEMF) for a position of a vent hole of the rotor in FIG. 1.

As shown in FIG. 3, if the central line $L_{CV}$ of the vent hole 171 is spaced apart from the central line $L_{CM}$ of the permanent magnets 161 such as electrical angles of 10° and 170°, respectively, it can be seen that the BEMF of the motor 130 is relatively low. As shown in FIG. 3, the BEMF gradually increases as the central line of the vent hole 171 is spaced farther apart from the central line of the permanent magnet 161. Also, the BEMF reaches its top level when the central line of the vent hole 171 is positioned in the range of an electrical angle between 80° and 100°, and has the highest value when the central line of the vent hole 171 is spaced apart from the central line of the permanent magnet at an electrical angle of 90° (or a mechanical angle of 45°). That is, as each vent hole 171 is closer to the central line $L_{CM}$ of the permanent magnet 161, the BEMF is decreased due to increase of the reluctance. On the other hand, as each of the vent hole 171 is farther from the central line $L_{CM}$ of the permanent magnet 161, the BEMF is increased. Here, if the central line $L_{CV}$ of the vent hole 171 is farther from the central line $L_{CM}$ of the permanent magnet 161 over an electrical angle of 90°, the central line $L_{CV}$ of the vent hole 171 is closer towards a center of another permanent magnet 161, which results in an increase in the reluctance.

Figure 4:
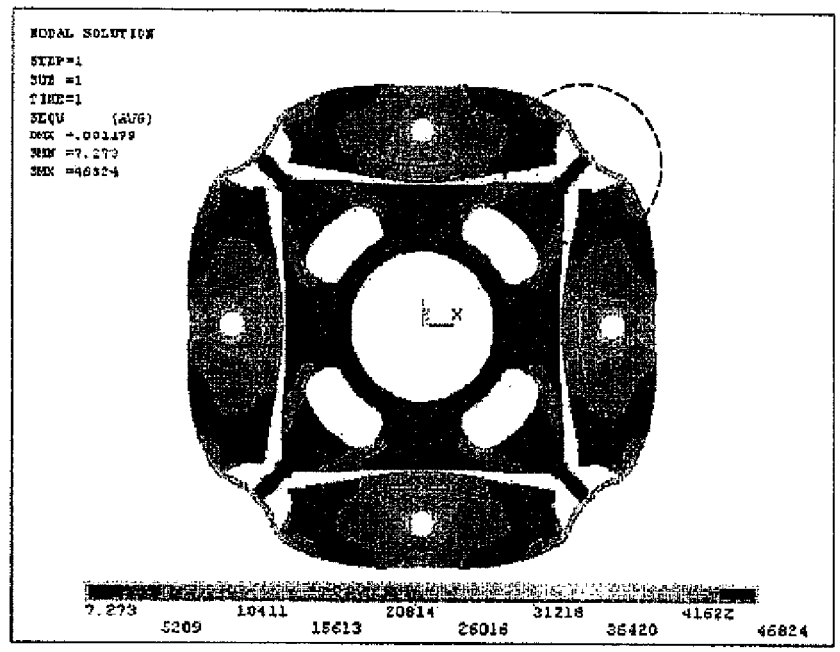
FIG. 4 is a view showing a concentration of stress on flux barrier regions upon the rotation of the rotor in FIG. 1.

As shown in FIG. 4, if the coupling hole 151 is positioned between the periphery of the rotor core 143 and the corresponding permanent magnet 161 and its center $O_1$ is on the central line $L_{CM}$ of the permanent magnet 161, a maximum value of stress, which is concentrated on each flux barrier 149 due to the centrifugal force upon the rotation of the rotor 141, is lowered.

For instance, if each coupling hole 151 is positioned between the rotation shaft 141 and the permanent magnet 161 and its center is on the to central line $L_{CM}$ of the permanent magnet 161, a maximum value of stress concentrated on the region of each flux barrier 149 is 256.0 MPa (here, 1 Pa=1N/m², and 1 MPa=1,000,000 Pa, rpm=7200 (120 Hz)). On the other hand, if each coupling hole 151 is positioned between the periphery of the rotor core 143 and the permanent magnet 161 and its center is on the central line $L_{CM}$ of the permanent magnet 161, a maximum value of stress concentrated on the region of each flux barrier 149 is remarkably lowered down to 46.8 MPa under the same rotating speed of the rotor, as shown in FIG. 4.

Figure 5:
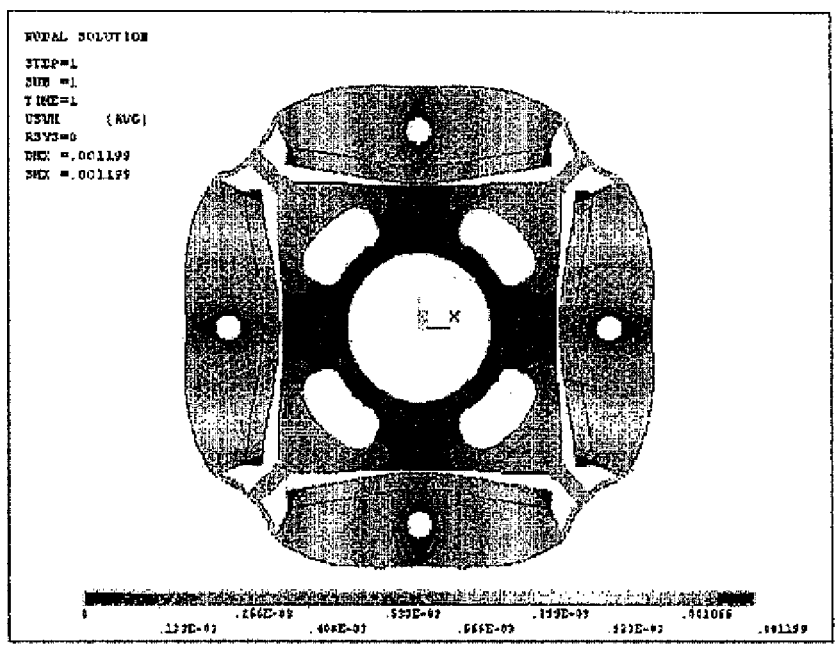
FIG. 5 is a view showing a deformation of an outer wall of the rotor upon the rotation of the rotor in FIG. 1.

Further, a deformation of an outer wall of the rotor core 143 as shown in FIG. 5, is decreased when the center $O_1$ of each coupling hole 151 is positioned on the central line $L_{CM}$ of the permanent magnet 161 and between the periphery of the rotor core 143 and the permanent magnet 161. For instance, if the center $O_1$ of each coupling hole 151 is positioned on the central line $L_{CM}$ of the permanent magnet 161 and positioned between the rotation shaft 141 and the permanent magnet 161, a maximum value of the deformation of the rotor core 143 in the radial direction upon the rotation of the rotor 141 is 13.1 μm (here rpm=7200 (120 Hz)) On the other hand, if the center $O_1$ of each coupling hole 151 is positioned on the central line $L_{CM}$ of the permanent magnet 161 and positioned between the periphery of the rotor core 143 and the permanent magnet 161, the maximum value of the deformation of the rotor core 143 in the radial direction upon the rotation of the rotor 141, as shown in FIG. 5, is decreased down to 1 μm under the same rotating speed of the rotor.

As described above, coupling holes are positioned at the outside of permanent magnets in a radial direction of a rotor core. Accordingly, deformation of a flux barrier may be reduced and, thereby to reduce a concentration of stress on a region of the flux barrier without a flux leakage.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. An interior permanent magnet brushless direct current (BLDC) motor comprising:
    a stator having a plurality of slots; and
    a rotor positioned in the stator, configured to rotate with respect to the stator, and having a rotor core, a plurality of permanent magnets positioned in the rotor core, a plurality of vent holes positioned between a center of the rotor core and the permanent magnets, and a plurality of coupling holes positioned between the permanent magnets and a periphery of the rotor core,
    wherein the rotor has four poles,
    wherein the plurality of permanent magnets are four in number,
    wherein each permanent magnet has a shape of a rectangular plate,
    wherein the rotor core comprises a plurality of permanent magnet insertion portions in which the permanent magnets are inserted, respectively,
    wherein the plurality of permanent magnet insertion portions are perpendicular to one another,
    wherein a center of at least one vent hole is positioned within a range of an electrical angle between 80° and 100° from a magnet central line of the rotor, and
    wherein a cross-sectional area of at least one vent hole corresponds to 6% to 8% of a cross-sectional area of the core.

2. The motor of claim 1, further comprising:
    a plurality of flux barriers positioned at the rotor core,
    wherein a flux barrier is disposed at each of both end portions of each permanent magnet insertion portion,
    wherein each flux barrier communicates with a permanent magnet insertion portion, and
    wherein each flux barrier extends along a radial direction of the rotor core to be adjacent to an outer circumference of the rotor core.

3. The motor of claim 2, wherein a central line of at least one vent hole is positioned at a center of adjacent flux barriers.

4. The motor of claim 1, wherein a center of at least one coupling hole is positioned within an electrical angle between −5° and +5° from a magnet central line of the rotor.

5. The motor of claim 1, wherein a central line of at least one vent hole is positioned at a center of two magnet central lines.

6. A compressor comprising:
a compression part positioned in a case and configured to compress a refrigerant; and
an interior permanent magnet brushless direct current (BLDC) motor configured to provide a driving force to the compression part, the BLDC motor comprising:
a stator having a plurality of slots; and
a rotor positioned in the stator, configured to rotate with respect to the stator, and having a rotor core, a plurality of permanent magnets positioned in the rotor core, a plurality of vent holes positioned between a center of the rotor core and the permanent magnets, and a plurality of coupling holes positioned between the permanent magnets and a periphery of the rotor core,
wherein the plurality of permanent magnets are four in number,
wherein each permanent magnet has a shape of a rectangular plate,
wherein the rotor core comprises a plurality of permanent magnet insertion portions in which the permanent magnets are inserted, respectively,
wherein the plurality of permanent magnet insertion portions are perpendicular to one another,
wherein a center of at least one vent hole is positioned within a range of an electrical angle between 80° and 100° from a magnet central line of the rotor, and
wherein a cross-sectional area of at least one vent hole corresponds to 6% to 8% of a cross-sectional area of the core.

7. The compressor of claim 6, wherein a center of at least one coupling hole is positioned within an electrical angle between −5° and +5° from a magnet central line of the rotor.

8. The interior permanent magnet BLDC motor of claim 1 further comprising a metal sheet through which the coupling holes pass through.

9. The interior permanent magnet BLDC motor of claim 1 further comprising a metal sheet through which the permanent magnet insertion portions pass through.

10. The compressor of claim 6 further comprising a metal sheet through which the coupling holes pass through.

11. The compressor of claim 6 further comprising a metal sheet through which the permanent magnet insertion portions pass through.

\* \* \* \* \*